(12) United States Patent
Lang et al.

(10) Patent No.: US 6,283,863 B1
(45) Date of Patent: *Sep. 4, 2001

(54) DRIVE UNIT

(75) Inventors: Heinrich Lang, Ergersheim; Wolfgang Seiboth, Bad Windsheim, both of (DE)

(73) Assignee: MEKRA Lang GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,936

(22) Filed: Apr. 4, 1997

(30) Foreign Application Priority Data

Apr. 16, 1996 (DE) .............................. 196 15 002

(51) Int. Cl.[7] ...................................... F16D 7/02
(52) U.S. Cl. ............................................. 464/44
(58) Field of Search ................. 464/42, 43, 44, 464/45, 46, 47, 30; 192/56.6, 56.55; 403/349

(56) References Cited

U.S. PATENT DOCUMENTS

| | | |
|---|---|---|
| 2,569,144 | 9/1951 | Benson . |
| 2,901,912 * | 9/1959 | Digby .................. 464/44 X |
| 2,974,503 * | 3/1961 | Newton .................. 464/44 |
| 3,265,362 | 8/1966 | Moody . |
| 3,648,483 * | 3/1972 | Garcia, Jr. .............. 464/43 |
| 4,043,149 * | 8/1977 | Tuninetti ............ 403/349 X |
| 4,043,206 * | 8/1977 | Narihro et al. .......... 464/43 |
| 4,133,344 | 1/1979 | Hunter et al. . |
| 4,641,887 | 2/1987 | Klueting . |
| 4,660,247 * | 4/1987 | Frohbieter et al. ....... 192/56.55 |
| 4,699,024 | 10/1987 | Iida et al. . |
| 4,880,407 | 11/1989 | Carton-Bacon . |
| 5,090,261 | 2/1992 | Nakatsukasa . |
| 5,092,440 * | 3/1992 | Nakano .................. 464/47 |
| 5,268,619 | 12/1993 | Vecchiarino . |

(List continued on next page.)

FOREIGN PATENT DOCUMENTS

| | | |
|---|---|---|
| 468386 | 4/1927 | (DE) . |
| 7627888 | 3/1977 | (DE) . |
| 2846586A1 | 5/1980 | (DE) . |
| 3013009A1 | 10/1981 | (DE) . |
| 3434905C2 | 4/1986 | (DE) . |

(List continued on next page.)

OTHER PUBLICATIONS

English Language Abstract for Japanese Patent No. 07195979 A, Published Aug. 1, 1995.
English Language Abstract for Japanese Patent No. 4–63738 A, Published Feb. 28, 1992.
English Language Abstract for Japanese Patent No. 52–22245, Published Feb. 19, 1977.

*Primary Examiner*—Lynne H. Browne
*Assistant Examiner*—Greg Binda
(74) *Attorney, Agent, or Firm*—Dority & Manning, P.A.

(57) ABSTRACT

A drive unit includes a housing defining a rotational axis, a drive shaft supported by the housing for rotation about the rotational axis, an actuator supported by the housing for rotation about the rotational axis responsive to rotation of the drive shaft, and a coupling mechanism for coupling rotation of the drive shaft and the actuator. The coupling mechanism includes a first frictional surface rotatable with the drive shaft and a second frictional surface rotatable with the actuator. The first and second frictional surfaces are mating conical frustrum surfaces, the first frictional surface driving the second frictional surface via friction upon rotation of the drive shaft. Means are included for urging the first and second frictional surfaces together. The urging means may include a compression spring. The coupling mechanism may include a friction ring non-rotatably mounted to the drive shaft, the first frictional surface being disposed on the friction ring.

10 Claims, 3 Drawing Sheets

U.S. PATENT DOCUMENTS

| | | |
|---|---|---|
| 5,625,502 | 4/1997 | Hoogenboom et al. . |
| 5,823,905 | 10/1998 | Torii et al. . |

FOREIGN PATENT DOCUMENTS

| | | | |
|---|---|---|---|
| 3412338C2 | 7/1986 | (DE) . | |
| 2820541C2 | 10/1986 | (DE) . | |
| 3741615A1 | 6/1989 | (DE) . | |
| 4006102A1 | 8/1990 | (DE) . | |
| 4115876A1 | 11/1991 | (DE) . | |
| 4119748C2 | 6/1994 | (DE) . | |
| 3914334C2 | 8/1994 | (DE) . | |
| 4311355C2 | 1/1995 | (DE) . | |
| 4324876C2 | 6/1995 | (DE) . | |
| 0545197A1 | 6/1993 | (EP) . | |
| 2509236 | 1/1983 | (FR) . | |
| 139648 | 3/1920 | (GB) . | |
| 2054496A | 2/1981 | (GB) . | |
| 2064682A | 6/1981 | (GB) . | |
| 5222245 | 2/1977 | (JP) . | |
| 463738A | 2/1992 | (JP) . | |
| 7-329206 | 12/1995 | (JP) . | |
| 193856 * | 3/1967 | (SU) | 464/44 |
| 211237 * | 2/1968 | (SU) | 464/44 |
| 9104172 | 4/1991 | (WO) . | |
| 9414633 | 7/1994 | (WO) . | |

\* cited by examiner

DRIVE UNIT

BACKGROUND OF THE INVENTION

The invention concerns a drive unit, and more particularly concerns a drive unit having a housing, gearing, shaft, actuator, and slip clutch.

In the case of a conventional drive unit of the usual type, there is provided an electric motor with a multi-step, RPM reducing drive enclosed in one housing. Between a drive shaft from the stepped down transmission and a driven component designed as a rotary actuator, a slip clutch is inserted which is comprised of several disks, i.e., a disk clutch. The disks are pressed together by a screw compressed spring, which, on the one side presses against the disks, and on the other side against the head of a screw, which is threadedly engaged in the drive shaft facility.

Motor-gear drive-units of this kind are installed for the activation of external mirrors on motor vehicles and particularly on trucks. The slip clutch is necessary so that the motor vehicle mirror, which is usually positioned by the motor driven actuator, can be also set by hand. The step-down gear drives are, naturally, self limiting.

The sliding moment, by the overstepping of which the frictional connection of the slip clutch is overcome, is not exactly defined, but varies within a non-reproducible range. In the case of a rotary movement contrary to the normal rotation, the screw will loosen itself, whereby the clutch will fail to hold. Moreover, there is a high cost of installation related to the many parts which must be handled.

OBJECTS AND SUMMARY OF THE INVENTION

Thus the present invention has the fundamental purpose of creating a drive unit for this general application which is comprised of few parts, is simple to install, and exhibits a very exact, predictable slip moment. This purpose will be achieved by means of the features of the claimed invention.

By means of the measures taken in accord with the invention, the achievement has been gained, that on conical frustum shaped friction surfaces, a very exact, definable friction moment is given, so that in turn, also a very exact, definable slip moment is available, thus, inside the tolerance limits within which the slip clutch operates, the moment is generally constant.

Additional objects and advantages of the invention will be set forth in part in the following description, or may be obvious from the description, or may be learned from practice of the invention.

Further features, advantages and details of the invention are to be gained from the following description of an embodiment with the assistance of drawings.

BRIEF DESCRIPTION OF THE DRAWINGS

There is shown by.

DESCRIPTION OF THE PREFERRED EMBODIMENTS

Figure 1:
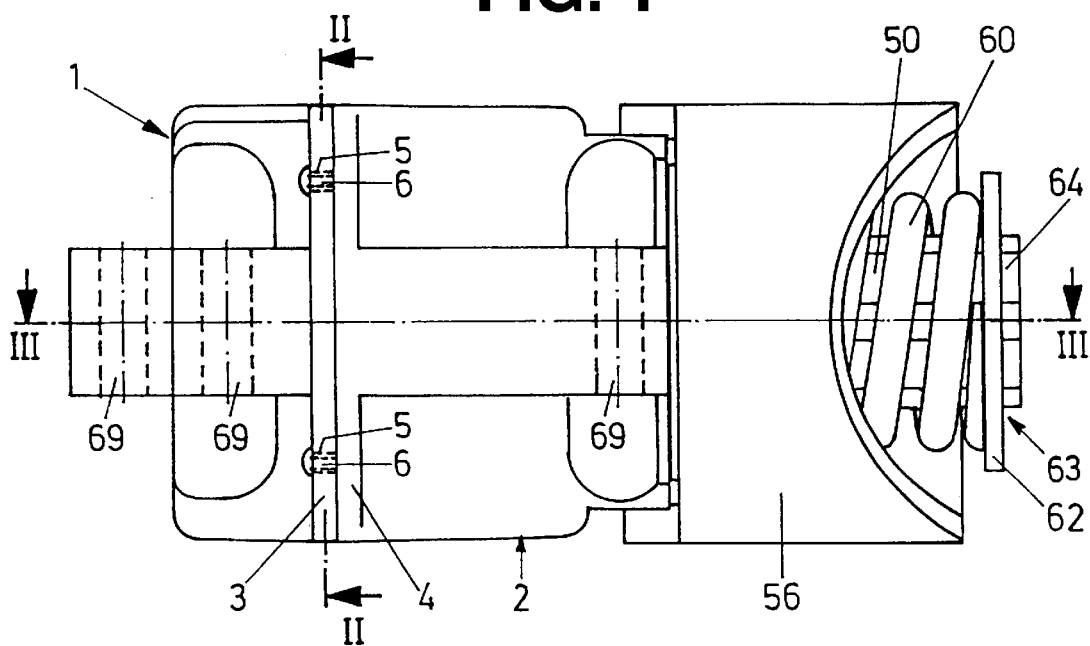
FIG. 1 a profile view of a motor drive unit in accord with the present invention, FIG. 2 a sectional view through the motor drive unit in accord with the section line II—II in FIGS. 1 and 3, FIG. 3 a sectional view through the motor drive unit in accord with the section line III—III in FIG. 1, FIG. 4 a longitudinal view of the ring gear of a drive, FIG. 5 a front view of the ring gear in accord with the arrow V in FIG. 4, and FIG. 6 a plan view of an annular thrust ring.
Figure 2:
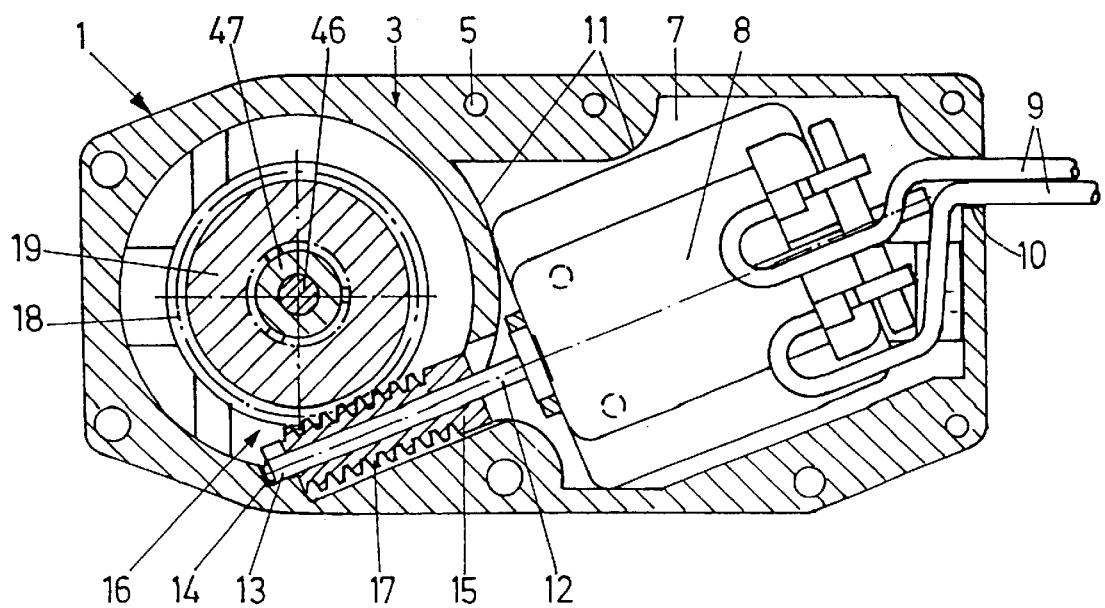

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield yet another embodiment. It is intended that the present invention include such modifications and variations.

The motor drive unit presented in the drawings exhibits a housing under-piece 1 and a housing upper-piece 2 consisting of a thermoplastic material with weldable properties and wherein the two said housing pieces are connected with matching flanges 3,4. Flange 3 of the housing under-piece 1 is provided with centering holes 5, while flange 4 of the housing upper-piece 2 is equipped with pins 6 which are aligned with the centering holes 5. These pins are introduced into the centering holes 5 and following the assembly and the combining of the housing under-piece 1 and the housing upper piece 2, said pins are welded in place, so that they simultaneously also serve for a firm connection of housing under-piece 1 and housing upper-piece 2.

The housing 1,2 is provided with a reception space 7 for an electric motor 8, the electrical supply 9 for which is brought in through an opening 10 in said reception space 7. The motor 8 is rotatable in either direction and hence drivable in both directions. The electric motor 8 lies in the reception space 7 against the detenting points 11. Thus, when so inserted into the housing under-piece 1, the motor 8 is already aligned in its position.

The electric motor is provided with a shaft 12, extending unencumbered and outwardly projecting from the housing 1, 2. The end 13 of said shaft remote from motor 8 is supported by a bearing seat 14 molded into the housing under-piece 1. Encapsulating the steel shaft 12 is a cylindrical worm drive 16, non-rotatably installed in respect to the shaft 12 by, preferably, force fit.

The helical cogging 17 of the worm 15 engages a corresponding toothing 18 of a worm driven gear 19, which, together with the worm 15, forms a worm drive 16.

The worm drive 16 is associated with a planetary drive 20. The planetary drive 20 includes a sun gear 21 which is non rotatably affixed as one part to the worm driven gear 19. In the outer circumferential cogging 22 of the sun gear 21, three planetary gears 23 (of which only one is shown) engage with their respective outer cogging. Beyond this, the planetary gears 23 support themselves on an annular interior gear 25, which is provided with an inner cogging 26 into which the respective circumferential cogging 24 of the planetary gears 23 engage. The annular gear 25 is, in respect to the housing, non-rotary, to which effect it is provided on its outer perimeter with projections 27, which protrude into the recess 28 of the housing 1,2. The planetary gears 23 are rotatably carried by bearing pins 29 of a web under-part 30 and are positioned relative to one another at equal angular displacements.

The planetary gears are generally designed to be in close contact with a gear 32 of an annular drive 33. The outer cogging of these gears 32 of the annular gear drive 33 interfit into an inner cogging 35 of a power take-off annular gear 36 of the annular gear drive 33.

In the gears 32 is found a bearing pin 37 of an upper-part of the web 38. The of under-part of the web 30 and the upper-part of the web 38 are in the middle of the constructed recesses 39 of the under-part of the web 30 and engage in the designed connection pins 40 of the web upper part 38, to bind to each other as a housing like web.

The driven annular gear 36 as shown is a single piece with cylindrical bearing section 41, which is concentric with the common rotation axis 42 of the worm drive gear 19, the planetary drive 20 and the annular drive 33. The annular gear 36 rests upon the bearing shell 43 which is installed on the housing upper piece 2. The driven annular gear 36 further is secured concentric with the rotation axis 42 relative to the housing upper piece 2 by means of the detent surfaces 44, 45 which extend also concentric to the rotational axis. These do not interfere with the rotation of the driven annular gear 36, but limit the play, that is, the displacement of the annular gear 36 along the rotational axis to about 0.1 mm.

The worm gear drive 16, the planetary drive 20 and the and the annular drive 33 together form a step-down gear drive.

The worm driven gear 19 is secured on a continuous, through steel axle 46, one end of which is set in a recess 47 in the housing under piece 1 with a force fit. The axle is non-rotating, in relation to the housing under piece 1. The other end of the axle 46 is in a concentric, cylindrical recess 48 of the of the driven annular gear 36, concentric to the rotation axis 42 and in great measure supported to be free of play, whereby, however, the non-rotating axle 46 does not interfere with the turning of the driven annular gear 36. The worm gear 19 is set for free rotary motion on the axle 46 and supported concentric to the turning axis 42 counter to the front side 49 of the recess 47 toward the housing under piece 1. Concentric with the annular gear 36, gear 19 is axially supported on annular gear 25 of the planetary gearing 20.

The driven annular gear 36, consisting entirely of metal, for instance of cast zinc, possesses a cylindrical driving shaft 50 which is part of the bearing component 41 which exhibits at least one, but preferably two, continuous, longitudinal grooves 51 which run on mutually diametrically opposite sides parallel to the rotational axis 42.

On the cylindrical driving shaft 50, a frictional ring 52 is installed which ring is part of a slip clutch 53, and which further engages the longitudinal grooves 51 respectively with a projection 54A. By this means, a non-rotational connection between the annular gear 36 and the frictional ring 52 is brought about. The frictional ring 52 lies against a ring binder 55 at the transition point from the cylinder bearing component 41 to the longitudinal grooves comprising a drive section 51, parallel to the rotational axis 42 making a firm connection. The ring 52 forms the above mentioned detent surface 45.

The drive shaft 50 is surrounded by an actuator cylinder 56, which shows a recess 57 running parallel to the rotational axis 42, in which a bolt (not shown) can fix a swiveling part. The actuator 56 possesses a friction surface 58 which lies against a friction surface 59 of the friction ring 52. Both friction surfaces 58, 59, are shaped as conical frustums and taper themselves in a direction away from housing upper piece 2 less than a half conical angle "a". The angle runs about $7° \leq a \leq 15°$, with a preference for a $\approx 10°$.

The actuator 56 is pressed in a direction toward the tapered friction ring 52 by a pre loaded helical compression spring 60, whereby, because of turning piece 56 and the friction ring 52, only the frictional surfaces 58 and 59 contact one another. Between these two parts, therefore, the above mentioned slip clutch 53 is brought into being, the slip moment being defined by the friction coefficients between the frictional surface 59 of the friction ring 52 and the friction surface 58 of the turning part 56, as well as through the force normal (90°) to the frictional surfaces 58, 59 and also defined by the average diameter "d". The force active between the friction surfaces 58, 59 and normal to the same, is proportionately greater at a prescribed force of the compression spring 60 parallel to the rotational axis 42, the smaller the half conical angle "a" of the frictional surfaces 58, 59 is. The active force between and normal to the friction surfaces 58, 59 is in any case about a magnitude greater than the force of the compression spring 60. This allows the situation that the friction ring is comprised of metal, for instance cast zinc, while the actuator 56 is of common plastic.

The helical compression spring 60 lies below the interposed annular disk serving as pressure disk 61 which disk bears also on the actuator 56. This pressure disk is likewise held non-rotatable in respect to driven annular gear 36 by means of projections 54B into the longitudinal groove 51. The friction moment acting between the pressure plate 61 and the actuator 56 is at least one tenth less than the slip moment of the slip clutch 53.

The compression spring 60 lies further in the area of the free end 64 of the drive shaft 50 against a further ring disk serving as detent 62, which, along with said drive shaft 50 is locked by means of a bayonet closure means 63. The two ring disks are composed of metals, for instance, steel. The are identical in structure and exhibit the projections 54 is which fit into the longitudinal grooves 51, which are identical in cross-section to the projections on friction ring 52.

Figure 3:
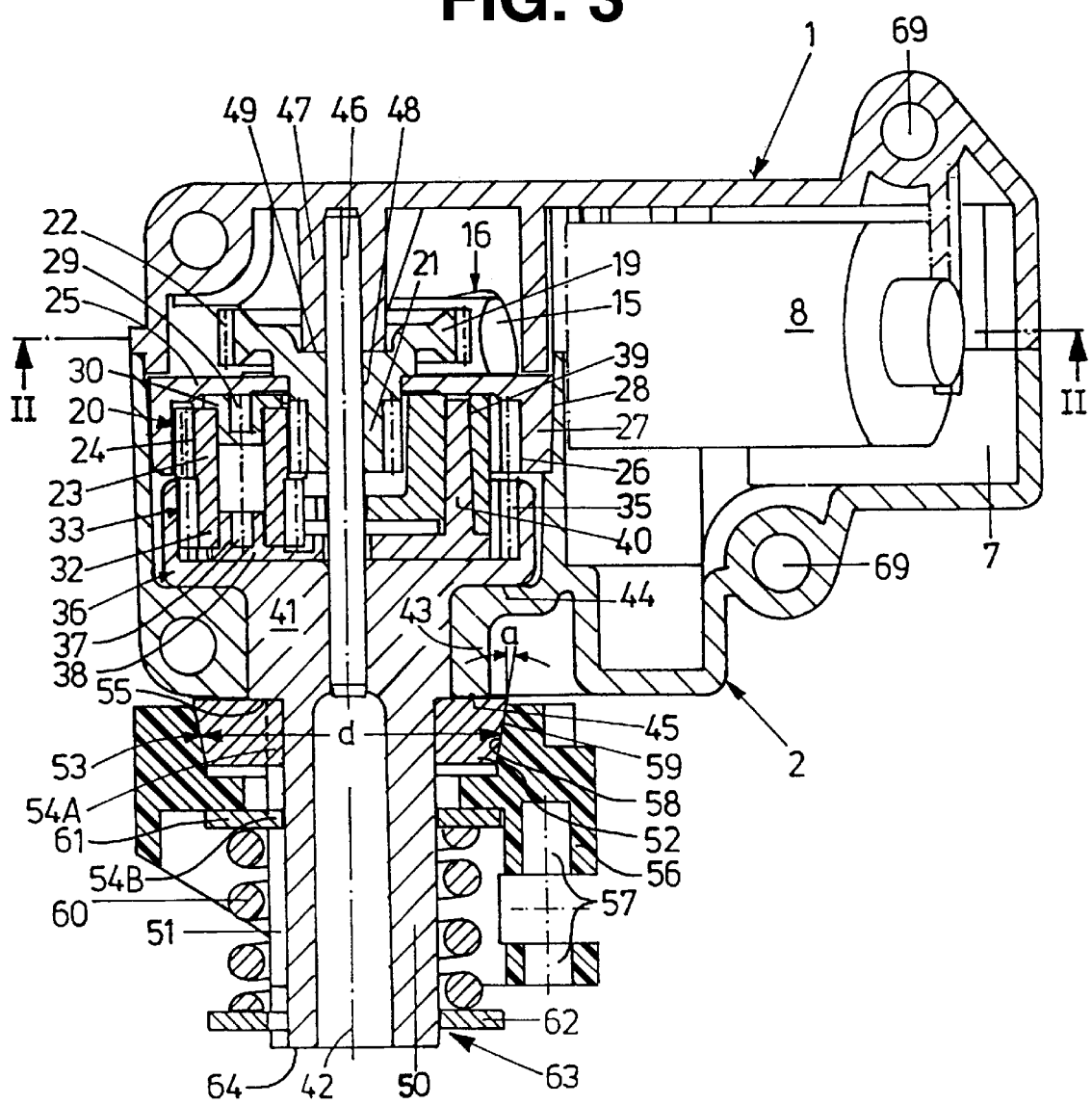
Figure 4:
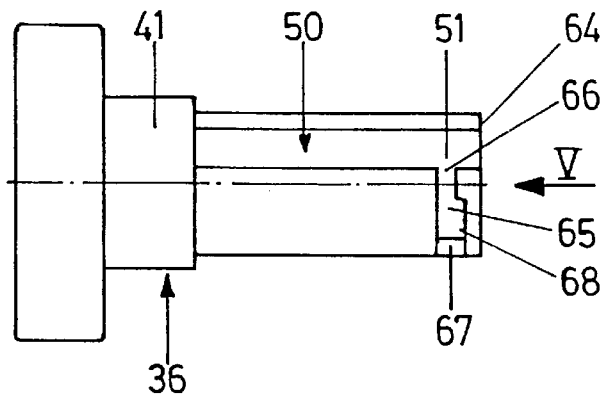
Figure 5:
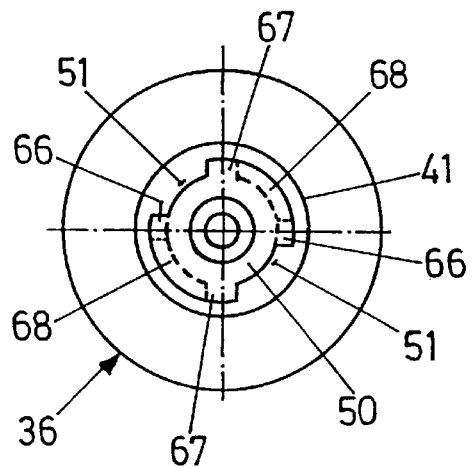
Figure 6:
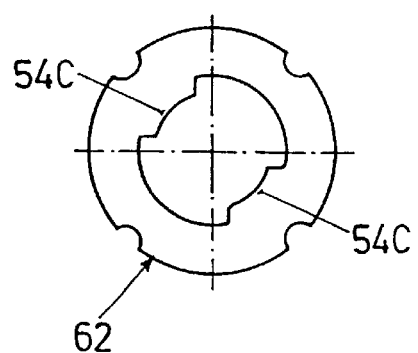

As may be inferred from the FIGS. 4 to 6, in combination with FIG. 3, for the bringing about of the bayonet clamp 63 in the area of the free end of 64 of the driven annular gear 36 on the drive shaft 50 respectively, a partial circumferential groove 65 is placed, which, on the one side runs into a longitudinal groove 51. Each partial circumferential groove is open on one end 66 to a longitudinal groove. Otherwise, the other end 67 to the respective other longitudinal groove 51 is shut. Each partial circumferential groove 65 shows a recess 68 directed to the free end, which corresponds to the projections 54C of the counter ring disk 62.

All gear wheels, with the exception of the driven annular gear 36, consist of plastic and are turnable around the rotational axis 42 or an axis parallel thereto.

The assembly proceeds in such a manner, that the electric motor 8 is installed in its receiving space 7 in the housing under-piece 1 and the electric leads 9 are brought in through the opening 10. The free end 13 of the shaft 12, which is already provided with the worm 15 is then placed in the bearing seat 14. First, or later, the axle 46 is pressed into the recess 47. Then the worm gear wheel 19 of the planetary drive 20 is slipped onto the axle 46, until it comes against the detent on the front side 49 of the recess 47.

Subsequently thereto, the annular gear 25 of the planetary gear drive 20 is pushed onto the axle. Then the premounted unit from web under-part 30, planetary gears 23 with gears 32 and web upper part 38 are so inserted into the annular gear 25, that the outer cogging 24 of the planetary gears 23 come into working contact with the inner cogging 26 of the annular gear 25. Thereafter, the driven annular gear 36 is slipped on the axle 46, whereby simultaneously the outer cogging 34 of the gears 32, along with the inner cogging 35 of the driven annular gear 36 come into working contact. Beyond this, the axle 46 is accepted in the recess 48 of the driven annular gear 36 and supported concentric to the rotational axis 42. Subsequently to this, the housing upper-piece 2 is set upon the housing under-piece 1, whereby the drive shaft 50 is brought through the bearing shell 43. The pins 6 of the housing upper-piece 2 fit, as this is done, in the centralizing holes 5 of the housing under-piece 1 and, along with said lower piece, are then welded by ultra-sonic means. The driven annular gear 36 is now concentrically secured with its bearing section 41 in the bearing shell 43 of the housing upper-piece 2. At the conclusion of this, the friction ring 52 of the slip clutch 53 is pushed on to the drive shaft 50 and then set upon the actuator 56, so that the two friction surfaces 58, 59 lie one on the other. Then the compression disk 61 is placed on the drive shaft 50 and the helical compression spring 60 also installed on the drive shaft 50. The helical compression spring 60 is preloaded against the frictional ring 52 by means of counter ring disk 62 and the disk 62 locked in place on the driving shaft 50 by means of the bayonet lock 63. As this is done, the counter ring disk 62 is forced on to the free end 64 by the compression of the spring 60 on to the free end 64 of the driving shaft 50, and upon reaching the partial circumferentially grooves 65 so turned, that the projections 54 enter into in these partial circumferential grooves 65 to the extent that they meet the detents at the closed end 67. Now, when the counter bearing ring disk 62 is released, it will be pushed so far in the direction toward the free end 64 until its projections come to rest in the recesses 68. In these recesses 68 then, the counter bearing ring disk is non-rotatable in respect to the driving shaft 50.

Also, disk 62 will not be released from shaft 50 due to rotation of the shaft in either direction, due to the seating of the projections 54 on the disk in recesses 68 on the shaft.

The finished and assembled motor drive unit can be mounted by means of designed fastening openings 69 on the housing 1,2 for its intended use. Such a use occurs, for instance, in external mirrors of motor vehicles and particularly for external mirrors provided on trucks.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A drive unit comprising:

a housing defining a rotational axis;

a drive shaft supported by the housing for rotation about the rotational axis;

an actuator supported by the housing for rotation about the rotational axis responsive to rotation of the drive shaft;

a friction ring slidably and non-rotatably mounted to the drive shaft and including a first frictional surface rotatable with the drive shaft, the actuator including a second frictional surface disposed about the first frictional surface, the first and second frictional surfaces being mating conical frustrum surfaces, the first frictional surface driving the second frictional surface via friction upon rotation of the drive shaft;

a detent non-rotatably secured to a distal end of the drive shaft;

a compression disk non-rotatably secured to the drive shaft; and a compression spring disposed between the detent and the compression disk for urging the compression disk against the actuator, thereby urging the first and second frictional surfaces together.

2. The drive unit of claim 1, wherein the detent is secured to the drive shaft via a bayonet connection.

3. The drive unit of claim 1, further including gearing mounted in the housing for rotationally driving the drive shaft.

4. The drive unit of claim 3, further including a motor mounted in the housing for driving the drive shaft via the gearing.

5. The drive unit of claim 1, wherein the friction ring includes a metal and the actuator includes a plastic.

6. The drive unit of claim 1, wherein a first slip moment is defined between the first and second frictional surfaces and a second slip moment is defined between the compression disk and the actuator, the second slip moment being at least one tenth less than the first slip moment.

7. The drive unit of claim 1, further including an axle fixedly mounted to the housing having a central axis coaxial with the rotational axis, the drive shaft rotating about the axle.

8. The drive unit of claim 1, wherein the conical frustrum surfaces are defined by a half cone angle of from about 7° to 15°.

9. The drive unit of claim 1, wherein the half cone angle is about 10°.

10. A drive unit comprising:

a housing defining a rotational axis;

a motor supported by the housing;

a drive shaft supported by the housing for rotation about the rotational axis;

gearing operatively connecting the motor and the drive shaft;

an actuator supported by the housing for rotation about the rotational axis responsive to rotation of the drive shaft;

a friction ring slidably and non-rotatably mounted to the drive shaft and including a first frictional surface rotatable with the drive shaft, the actuator including a second frictional surface disposed about the first frictional surface, the first and second frictional surfaces being mating conical frustrum surfaces, the first frictional surface driving the second frictional surface via friction upon rotation of the drive shaft;

a detent non-rotatably secured to a distal end of the drive shaft;

a compression disk non-rotatably secured to the drive shaft; and a compression spring disposed between the detent and the compression disk for urging the compression disk against the actuator, thereby urging the first and second frictional surfaces together.

* * * * *